United States Patent
Laurent

(10) Patent No.: US 8,921,639 B2
(45) Date of Patent: Dec. 30, 2014

(54) THERMAL TREATMENT OF CARBONACEOUS WASTE

(71) Applicant: Electricite de France, Paris (FR)

(72) Inventor: Gérard Laurent, Villeurbanne (FR)

(73) Assignee: Electricite de France, Paris (FR)

( * ) Notice: Subject to any disclaimer, the term of this patent is extended or adjusted under 35 U.S.C. 154(b) by 272 days.

(21) Appl. No.: 13/732,885

(22) Filed: Jan. 2, 2013

(65) Prior Publication Data
US 2014/0121440 A1    May 1, 2014

(30) Foreign Application Priority Data

Oct. 29, 2012  (FR) ..................................... 12 60282

(51) Int. Cl.
| | |
|---|---|
| G21F 9/14 | (2006.01) |
| G21F 9/34 | (2006.01) |
| B01D 59/10 | (2006.01) |
| G21F 9/00 | (2006.01) |
| G21F 9/30 | (2006.01) |
| B01D 53/14 | (2006.01) |

(52) U.S. Cl.
CPC ........ *G21F 9/34* (2013.01); *B01D 59/10* (2013.01); *G21F 9/007* (2013.01); *G21F 9/30* (2013.01); *B01D 53/1475* (2013.01)
USPC .............................. 588/19; 588/317; 588/410

(58) Field of Classification Search
USPC ............. 588/19, 18, 20, 317, 410, 412
See application file for complete search history.

(56) References Cited

U.S. PATENT DOCUMENTS

| | | | |
|---|---|---|---|
| 2010/0234664 A1* | 9/2010 | Laurent | 588/18 |
| 2011/0319699 A1* | 12/2011 | Laurent | 588/19 |

\* cited by examiner

*Primary Examiner* — Edward Johnson
(74) *Attorney, Agent, or Firm* — Drinker Biddle & Reath LLP

(57) ABSTRACT

A method is provided for the decontamination of radioactive carbonaceous material, such as graphite, in which an injection of steam is planned into the material, concurrent with a first roasting thermal treatment of the material at a temperature between 1200° C. and 1500° C. Advantageously, the first treatment may be followed by a second treatment at a lower temperature with an injection of carbon oxide for oxidation according to the Boudouard reaction.

15 Claims, 2 Drawing Sheets

THERMAL TREATMENT OF CARBONACEOUS WASTE

CROSS-REFERENCE TO RELATED PATENT APPLICATION

This application claims the benefit of French Patent Application No. 12 60282, filed on Oct. 29, 2012 in the French National Institute of Industrial Property, the entire content of which is incorporated herein by reference.

BACKGROUND

Disclosed herein is a method and facility to decontamination of radioactive material in connection with the processing of nuclear waste, and more particularly to the treatment of carbonaceous waste, including graphite. Nuclear reaction is often contained and stopped in the reactors with graphite sleeves. At the end of their service life, these sleeves must be treated. They then form a graphite matrix containing carbon-14 (C14).

These radioactive carbon forms must be isolated and stored in sealed containers. For this purpose, it is necessary to "break" the aforementioned graphite matrix to extract from it especially the C14 isotope. This step is usually carried out at a high temperature. Then, this isotope is precipitated for solid storage as a result of this precipitation reaction (e.g., by reaction with the lime to obtain a compound of the type $CaCO_3$).

Conventional treatment consists of reforming by steam (or "steam reforming") the graphite matrix, described for example in U.S. Pat. No. 6,625,248. However, the technique of said document does not really allow isolating primarily the C14 and C13 isotopes and thus ensuring acceptable radioactive waste.

There was proposed in the document FR-2943167 a very promising technique for heat treatment that allows a particularly effective isotopic separation of carbon.

Nowadays, we can achieve by such techniques an effective decontamination of tritium, carbon-14 and a part of chlorine-36. Other radionuclides are not volatile and so they are recovered in the residue at the end of a phase of steam reforming.

However, for these technologies to be of interest, it is necessary to carefully define the choice of the purge gas to obtain a maximum initial decontamination of the product associated with a loss of mass as low as possible. The term "purge gas" refers to the gas that is injected into the thermal treatment furnace (or "roaster") during the thermal treatment step for decontamination of the graphite.

This decontamination must be sufficiently efficient without generating an excessive loss of mass in the graphite. Indeed, the graphite loss of mass generates volumes of secondary waste (carbon-14 and chlorine-36 enriched in a mineral matrix), which are expensive in terms of space for storage, the latter to be stored in deep geological formations (deep storage).

Indeed, what is called "graphite" here is a material used in reactors called NUGG for "natural uranium-graphite-gas" or MAGNOX or AVR, as the neutron flux moderator. It is actually a set of materials with sometimes marked differences in their structures, typically in their origins and, for example, their operating conditions (temperature, fluence, radiolytic corrosion, etc.), which may be different in nuclear plants, because these operating conditions have changed their structure. The variability of the reactivity of these structures is the underlying factor in the performance reproducibility.

Moreover, besides the original structural character of the graphites used in gas graphite reactors, a number of parameters affect their reactiveness and ability to be decontaminated, including:

Fluence, the effect of which is destructuring the graphite matrix: irradiated graphite is no longer graphite (in terms of crystallography) and manifests structural and nanostructural disruptions related to irradiation (as electron microscopy images can show);

Temperature, the effect of which—for temperatures of 1000° C. and above—is healing the destructuring that can be generated by high fluences: a medium-irradiated but highly heated graphite can be decontaminated less well than graphite that is very highly irradiated;

Radiolytic corrosion, which produces a scouring effect on the graphite and sparks decontamination of C-14 in the reactor;

Porosity: the pore size also plays a role.
  Nanometric pores increase the probability of reaction with the purge gas, but decrease the accessibility to the active sites (where there are radioactive isotopes).
  Micrometric pores decrease the probability of reaction, but increase the accessibility to the active sites.
  Other influential parameters include the influence of water and the nature of the original coke.

Given this variability of irradiated graphites and correlations between the calculations and measurements at the level of the radiological inventories that have been established, the dominant parameters for the irradiated graphite typically are:

The choice of purge gas used in the thermal treatment phase;

A large heterogeneity of the radioactivity's spatial distributions;

Radioactivity to be found mostly in the most-degraded areas, because these areas are more reactive: typically at the edge of the sheet or in the interstitial of graphite matrix.

Thus, there remains the task to optimize the choice of the purge gas injected during the thermal treatment.

SUMMARY

Various embodiments of the present invention address the situation in this regard, providing a process for decontaminating radioactive carbonaceous material, in particular graphite, comprising an injection of steam into said material, concurrently with a first thermal treatment of the lattice of the material at a temperature between 1200° C. and 1500° C., preferably about 1300° C.

Advantageously, the steam is injected into a reactor, whose water content is measured for controlling the amount of injected water steam, and before the aforementioned first thermal treatment, a drying stage is provided for the material in order to control the amount of water present in the reactor.

Advantageously, the steam is injected with a gaseous fluidizing agent, such as for example a gas comprising hydrogen to ensure cycling.

In one embodiment of the invention, the method further comprises a second thermal treatment of the lattice with an injection of carbon oxide gas. This second treatment can be performed before the first treatment, but preferably it is carried out after it. In addition, this second treatment, consisting of mild oxidation according to the Boudouard reaction, is very advantageous in itself and may be protected separately.

Preferably, the second thermal treatment is performed at a temperature between 900° C. and 1100° C. with a temperature increase to about 1100° C. at the end of said second thermal treatment (for example with an increase in temperature from about 950° C. to 1100° C.).

Preferably, the carbon oxide gas is diluted with an inert gas (for example nitrogen), and in one embodiment, the dilution of the carbon oxide gas is increased during the second thermal treatment from a proportion of approximately 75% inert gas to about 90% inert gas at the end of the second thermal treatment.

Preferably, the carbon oxide gas comprises carbon dioxide, with an increasing proportion of carbon monoxide, for example from 0 to about 50% at the end of the second thermal treatment.

In one example of embodiment of the invention, there can be provided:
- an injection of slightly diluted carbon dioxide (with 25% $CO_2$ and 75% nitrogen, for example) at a temperature of 900° C. to 950° C., then
- an injection of carbon monoxide and carbon dioxide (with proportions of 50% and 50%) diluted to 10% in 90% of nitrogen and at a temperature of about 1100° C.

In one possible embodiment of the invention, there may be provided a third thermal treatment at the end of the roasting of the material by a temperature increase of between 1500° C. and 1600° C.

The roasting may advantageously be preceded by a grinding of the material into particles of a size between 1 and 10 mm.

The present invention also relates to the facility comprising means for the implementation of the above method, and which for this purpose comprises at least one thermal treatment reactor and at least one gas inlet for the injection of water vapor (at least, it being understood that other gases may also be injected, in particular a carbon oxide gas).

BRIEF DESCRIPTION OF THE DRAWINGS

Other features and advantages of the invention will become apparent upon reading the descriptions given below of examples of embodiments of the invention, and upon reviewing the accompanying drawings, in which.

DETAILED DESCRIPTION

Figure 1:
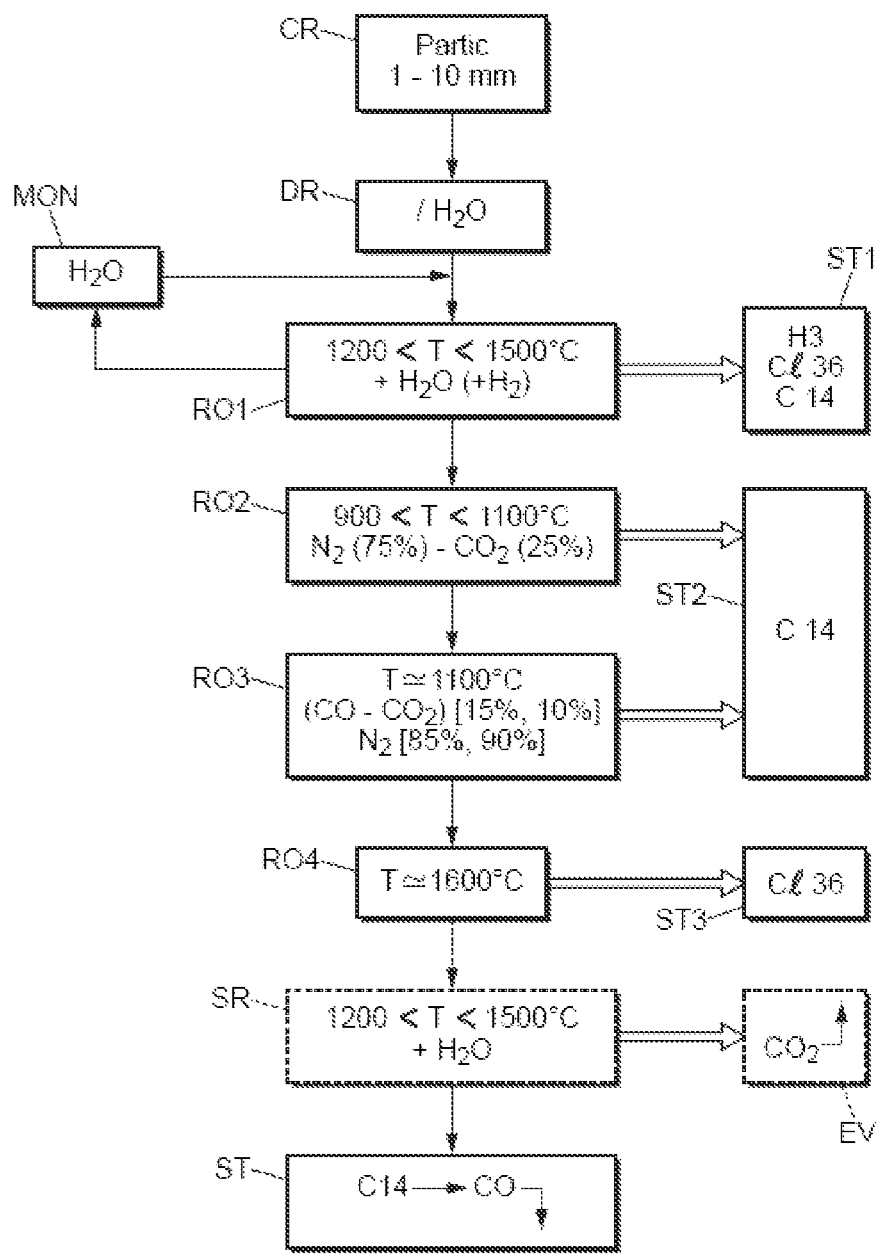
FIG. 1 illustrates the main steps of a method according to an embodiment of the invention.
Figure 3:
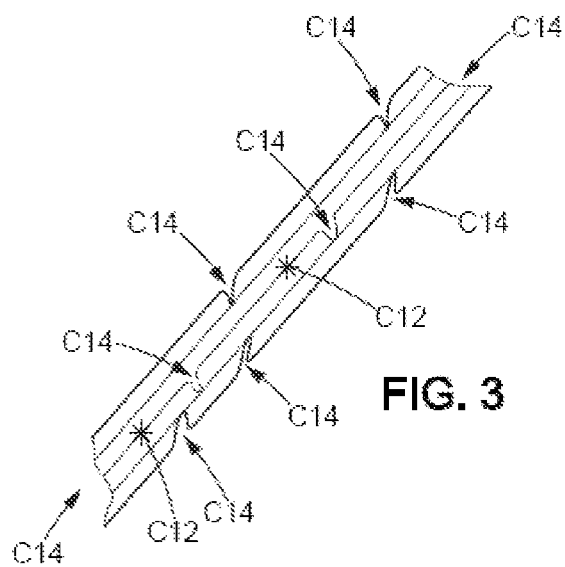
FIG. 3 shows a graphite matrix comprising graphene planes with structural irregularities in which the probability of the presence of carbon-14 is high.

FIG. 1 describes an example of the method of treatment of radioactive carbonaceous waste, typically including graphite (graphite sleeves are commonly used around the core of a nuclear reactor to absorb neutrons from the nuclear reaction). Such carbonaceous waste presents radionuclides that are typically the isotope carbon-14 (C14), the isotope chlorine-36 (C136) and tritium (H3). We then seek to selectively isolate these isotopes, in particular in relation to the natural isotope carbon-12 found particularly in graphite. These isotopes, once isolated, then each take part in a liquefaction or solidification reaction in order to be stored in containers that are to be buried. We then understand that the step of isolating the radioactive isotopes is crucial to limiting the quantity and, hence, the volume of products to be buried. In particular, we seek to limit to a minimum the amount of carbon in the form of natural isotope C12, while trapping as much as possible the radioactive isotope C14, in the products to be buried. We then understand that we are trying to avoid what hereinafter is called "too large of a mass loss" during the treatment steps described below (it being understood that the "mass loss" will have to be buried and/or decontaminated by other means). Embodiments of the invention are thus based on the observation that, in particular in graphite, the radioactive isotope C14 is mostly found in the matrix irregularities that form the various successive graphene planes, e.g., at the border of the graphene plane sheets of the . This observation is explained by the fact that neutrons, when impacting the graphite sleeves, eject carbon atoms beyond their natural position in the graphene layers of the graphite matrix, creating dislocations and more generally structural irregularities. Thus these carbon atoms, becoming radioactive carbon-14 isotopes, are most often found in these areas of structural irregularities, while the natural carbon-12 isotope remains the constituting element of the core of the graphene planes (FIG. 3).

In particular, the graphite is ground in step CR to form particles having dimensions typically between 1 and 10 mm in average diameter. This CR step can be achieved in a reactor used for the following steps, or in a storage facility. It is advantageous to inject water ($H_2O$) during this CR step to facilitate the grinding process. Then, the next step, DR step, consists of drying the particles thus obtained. As we will see later, it is in effect preferable to control the amount of water that these particles may contain before the general step of roasting, next, especially if the previous phase of extracting the graphite present in the reactor is carried out under water.

This roasting step begins with a first operation RO1, at an elevated temperature typically between 1200° C. and 1500° C. (for example 1300° C.), wherein the steam is injected into the graphite particles. It has been observed that under these conditions tritium (H3) could be effectively trapped and the same applies to radioactive chlorine C136. In particular, under these conditions, water vapor is inserted into the core of the graphite particles to react with these particular isotopes. This operation RO1 further provides an injection of hydrogen ($H_2$), because it has been observed that this gas ($H_2$) plays the role of flux to promote the integration of water, especially in the interstices of the graphite matrix. This is how a first portion of the interstitial carbon-14 (C14) is also trapped by oxidation upon reaction with the water vapor. These isotopes are then trapped and isolated in step ST1.

The roasting step is then continued by an operation RO2, a "softer" oxidation, by the reaction called "Boudouard" with carbon monoxide (CO) and/or carbon dioxide ($CO_2$). Indeed, if we pursue "aggressive" oxidation by injecting steam, the latter creeps beyond the interstices and reacts with a mixture of radionuclide isotope C14 and natural isotope C12, which is sought to be avoided in order to not have to bury (or decontaminate) the products of this reaction. This is why in step MON we watch the amount of water present in the waste-treatment reactor. To this end, a humidity sensor may be installed in situ, as well as an escape route for water to control the amount of water that the reactor contains. During said "softer" oxidation RO2, the temperature is lowered to a range between 900° C. and 1100° C. (for example 1000° C.). In an inert gas atmosphere (for example nitrogen $N_2$), carbon dioxide ($CO_2$) is first injected, with for example a proportion of about 25% carbon dioxide to 75% nitrogen. Then, in the following operation RO3, the temperature is gradually raised to about 1100° C. and we gradually decrease the amount of oxygen in the injected gas by providing for example a mixture of carbon monoxide and dioxide (CO—$CO_2$) and/or an increasing dilution of carbon monoxide-dioxide in the inert gas. For example, a mixture of 50% carbon monoxide and 50% carbon dioxide can be diluted to 15% in a nitrogen gas, and then to 10% in nitrogen. This "softer" oxidation will gradually trap all the carbon-14 still present in the graphite matrix in step ST2, without causing the C12 atoms to react, which are more firmly "attached" to their graphene plane.

The roasting step finishes by raising the temperature to about 1600° C. (step RO4). This last operation is designed to eject the last chlorine atoms that may be still present in the graphite matrix (C136 isotope recovered in step ST3). It should be noted that such a high temperature promotes a high atomic mobility which allows recovering the C136, but also produces an effect of "annealing" in the matrix with a healing of irregularities and gaps due to the mobility of atoms at such a temperature. Thus we enclose any residual C14 isotope atoms in the core of the matrix. However, it has been observed that the radioactivity remaining in the decontaminated and restored graphite, which is low, is also very difficultly released or sealed, which makes it suitable for surface or sub-surface storage under sound conditions vastly improved compared to the original porous material (that is to say the original untreated irradiated graphite).

The method may then terminate in an optional step SR (represented by dashed lines) consisting of a steam reforming step usually carried out at a temperature between 1200° C. and 1500° C. (for example 1300° C.) with an injection of steam to oxidize the carbon in the graphite matrix. As a precaution, it may further be decided to isolate the product of this reaction in a first stage for decontamination and/or confinement, but to discharge the gaseous product of this reaction into open air after the above first stage and during a vapor evacuation step EV (as carbon monoxide and/or carbon dioxide), according to the process described in FR-2943167.

In the final step ST, the gasified carbon in the form of carbon monoxide and/or carbon dioxide, resulting from the successive oxidation reactions (and essentially comprising the isotope C14), is then separated from the steam and other gases (for example $N_2$ and H2), and then solidified by solid precipitation reaction (for example, with lime to form $CaCO_3$) to be confined in a container and permanently buried.

Of course, the quantities of reactive gas injected and the reaction times depend on the amount of waste introduced into the reactor. Nevertheless, below we provide technical explanations allowing a person skilled in the art to optimize, without undue hardship, such parameters for the implementation of the treatment according to embodiments of the invention.

At the first grinding step, typically through crushing, because the irradiated graphite is initially stored in water, the tritium is largely released from the graphite.

In addition, the chlorine-36 is also probably highly decontaminated from the graphite's immersion in water (typically in the case that the graphite gas reactor is chosen to be dismantled under water).

As a result, the effectiveness of the treatment proposed essentially relies on carbon-14.

To this end, as shown above, the particle size has a significant influence. However, it must be optimal: if the diameter is large, a system of diffusion of the purge gas (for oxidation) is established, but the rate of gasification decreases. However, the selectivity of trapping C14 compared to C12 depends on the existence of the diffusion system.

The reaction parameters that influence the kinetics of gasification of carbonaceous materials are, in particular, the temperature, pressure and particle size.

If the temperature increases:
 the reaction rate increases,
 but we move from a favorable system of internal diffusion to a non-selective external diffusion;

If the diameter of the particles increases:
 a favorable diffusion system tends to be reached,
 but the overall gasification rate decreases while the selectivity depends on the diffusion system;
If the pressure increases:
 the reaction rate increases,
 a plateau at a certain partial pressure according to the temperature is observed.

In the processes described above, the roasting in particular is done at a very slight overpressure relative to the atmospheric pressure.

Apart from the influence of these parameters, the choice of the gases successively used during the treatments is also crucial, of course. Thus, to obtain from the very beginning of the treatments a satisfactory fluidity of the graphite waste, hydrogen ($H_2$) is injected. Then, for the "aggressive" decontamination of carbon-14 (C14), tritium (H3) and chlorine-36 (C136), a steam injection is used. Afterward, a mixture of carbon monoxide (CO) and carbon dioxide ($CO_2$) (according to the Boudouard reaction: $C_{(solid)}+CO_{2(gas)} \rightarrow 2CO_{(gas)}$) is used for a softer isolation (a more selective oxidation) of C14. In particular, a mechanism for chemical sorbing of $CO_2$ is implemented to form a C(O) complex on an active site (typically an irregularity at the edge of the sheets of the graphite matrix) according to a reaction of the type $C_{(solid)}+CO_{1-2(gas)} \rightarrow C(O)+CO_{(gas)}$.

The gradual dilution of the inert gas of the injected CO—$CO_2$ gas favors desorption of the CO gas from the matrix graphite, which contains the radioactive isotope C14 and can then be isolated, solidified and stored.

Thus, the treatment by injection of carbon monoxide and carbon dioxide (CO—$CO_2$) according to the Boudouard reaction can decontaminate the graphite in the areas most destructured by irradiation, softly and without significant loss of mass. In fact, the surfaces made of the free carbon atoms on site (on which these atoms are therefore most accessible) are the first to react. These are places in the graphite matrix containing many pores and corresponding to destructured graphite, thus very much irradiated. This method of oxidation does not, however, reach the inside of the graphite matrix. Only the accessible graphite (most likely containing the C14) is trapped.

The interesting properties of a CO—$CO_2$ mixture can be explained by the fact that the $CO_2$ (at 25% of the mixture) is very reactive. Its use in a mixture with CO is highly technically interesting. The CO/$CO_2$ mixture can then be assayed in order to reduce the reactivity of the solution (in particular when the graphite is porous). Further, at the same concentration of $CO_2$, it appears that a mixture of $CO_2$/CO better limits the loss of mass than a mixture of $CO_2$/$N_2$.

Next, the rise in temperature (to around 1600° C.) is performed after the decontamination of the C14 matrix, because a high rise in temperature may "heal" the graphite and could seal internally, of a sort, a remnant of C14 atoms in the restored matrix. Indeed, this "healing" phenomenon (healing the graphite) is not unique to the internal energy of the matrix, because it appears also for other physical properties of irradiated graphite at temperatures similar to annealing. It actually corresponds to the disappearance of the defects created in graphite by neutron irradiation, which can be interpreted qualitatively: the defects created in the graphite by irradiation are interstitial in nature. The interstitial atoms are grouped in clusters between the crystalline layers, and the recombination of the clusters of interstitial atoms with the gaps can occur only if the gap mobility is sufficient. This mobility can "cure" the damage, and the gap mobility seems to become significant from 1200° C. to 1500° C., which explains the healing effect beyond this annealing temperature.

More specifically, the clusters of interstitial atoms can reach large dimensions at high radiation doses and group themselves into hexagonal crystallographic assemblies, possessing covalent bonds similar to those of the graphite layer. These hexagonal clusters begin to disappear around 1200° C. when the gap mobility becomes sufficiently significant. However, at higher radiation doses, gaps can in turn form assemblies with a migration energy that is higher than that of isolated gaps. In this case, the thermal curing of the defects is reached at even higher annealing temperatures, typically above 1500° C.

This step, however, allows the release of all the chlorine-36 and tritium still present in the core of the matrix.

Usually, most of the carbon-14 (C14) to be trapped and the chlorine-36 (CL36) is found interstitially or at the edge of the sheet. However, at 1600° C., the graphite is restored (regardless of the temperature ramp and the history of the graphite, as explained above). Even if this restructuring is only partial, as the gaps and interstices are "cured," the chlorine-36 and tritium are ejected.

If the performance in terms of decontamination of the carbon-14 is sufficient, the remaining graphite matrix is destroyed. Otherwise, the process can be followed by a surface disposal of the solid secondary waste or a subsurface burial. The leaching and degassing conditions obtained for the graphite thus treated are in any case likely to allow a superficial storage (sub-surface or even surface burial and not "under the hill" as in some cases).

Figure 2:
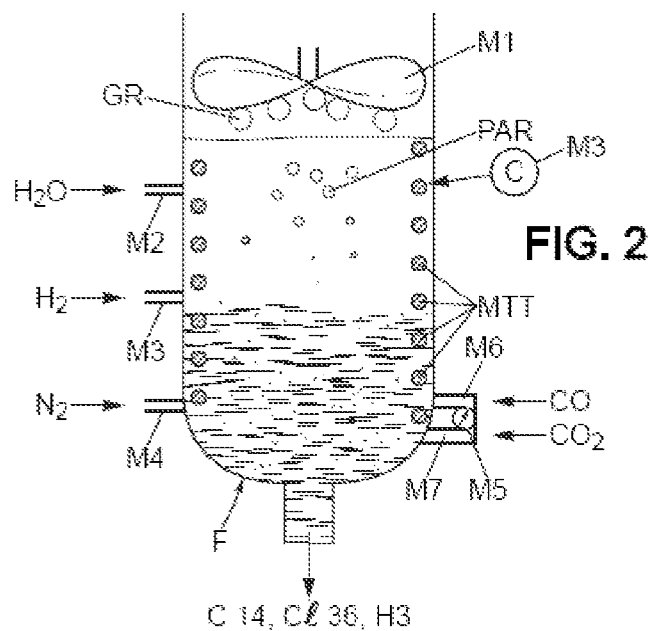
FIG. 2 shows an example of facility for the implementation of this method.

Reference is now made to FIG. 2, which shows a facility for the implementation of the above method. FIG. 2 shows a compact implementation of the process. However, alternatively, it can be possible to expand some treatment stations (e.g., the grinding means M1, or the various tanks and furnaces for certain thermal treatment stages).

The system typically comprises a grinder M1 that is capable of transforming the waste graphite GR into particles PAR of a diameter, for example, from 1 mm to 10 mm. These M1 means are generally planned directly downstream of the treatment furnace (for example the reactor or storage). In FIG. 2, the grinding means M1 are represented directly downstream of the furnace. At any rate, it is preferable that the grinding step is performed in water, in a separate grinder, and that the particles resulting from this treatment are dried in the furnace F before roasting. The furnace F comprises the means for thermal treatment MTT, as well as the means for injecting the selected purge gas, with:

the means for injecting steam M2 ($H_2O$), and the means to control M3 the water content in the reactor F in order to implement the first roasting step at about 1200° C. to 1500° C. and slightly above the atmospheric pressure, which allows releasing tritium H3, chlorine Cl36 (the majority of which is released at this stage) and carbon C14, the means to inject M3 hydrogen $H_2$ for a cycling that favors the fluidity of interaction with the steam that is injected by means M2, the combined means M6 and M7 to inject a mixture of carbon monoxide and carbon dioxide ($CO$—$CO_2$), in proportions adjustable by the implementation of a controlled mixing means M5, and the means to inject M4 inert gas such as nitrogen $N_2$ to dilute the mixture of carbon oxides.

The thermal treatment means are capable of applying heat in a range of from 800° C. to 2000° C., for example from around 900° C. for a soft oxidation according to the Bouduard reaction to more than 1500° C. to create a final thermal shock at the end of the treatment, as described above.

The system can comprise a same position or a separate position for a later stage (optional and therefore not essential) of steam reforming, for example at about 1300° C. (typically 1200 to 1500° C.).

Of course, the particular means that comprises the facility can be tailored to the type of waste to be treated.

For example, the injection of steam $H_2O$ and hydrogen $H_2$ (in step RO1 described above) is preferentially related to the time the graphite spends immersed in water during the dismantling of the waste. It is thus preferable to precisely control in situ the amount of steam injected into the roasting reactor F in FIG. 2 to avoid excessive loss of mass of the graphite matrix and thus an excessive amount of material to be stored.

Steam has two origins:
that escaped from the humid graphite during the dismantling of the reactor (if the method of dismantling the gas graphite reactor is under water),
that injected to treat the graphite by steam reforming.

An ad hoc instrumentation is installed at the gas-injection level on the roaster F to control the amount of steam injected. In addition, a portion of the steam is expected to condense at the exit of the roaster. The difference between the mass of water injected at the input and the mass of water collected at the exit advantageously provides a water body required for wetting the original graphite.

Thus, the amount of steam present is continuously controlled.

Below are summarized the main steps used in the treatment as follows:

injection of $H_2O$ preferably in a limited quantity, followed by the evacuation of steam (given an initial moisture content in the waste): this step allows the removal of C14 and HCl and the majority of tritium, with a very low loss of mass;

injection of $CO$—$CO_2$ according to a mild oxidation of the destructured zones: this step allows the removal of C14, again with a very low associated loss of mass;

steep rise in temperature (up to 1600° C.) under an inert atmosphere (e.g., nitrogen) for the restructuring of the graphite: this step allows an exit of C136 and any remaining tritium.

After obtaining a graphite sufficiently decontaminated, the remaining waste can be:

stored in a centre or buried in this state,

Or, if decontamination is sufficiently achieved (decontamination of the magnitude of 95% with an associated loss of mass in the magnitude of 5%), destroyed by a process of steam reforming by advantageously obtaining free waste as described in the document FR-2943167.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the invention.

What is claimed is:

1. A method of decontamination of radioactive carbonaceous material, comprising:
   inducting steam into said material, concurrent with a first roasting thermal treatment of the material at a temperature between 1200° C. and 1500° C.,
   and further comprising:
   drying the material to control the amount of water present in the reactor prior to the first roasting thermal treatment.

2. The method according to claim 1, wherein steam is injected into a reactor, whose content of water is measured for controlling an amount of steam injected.

3. The method according to claim 1, further comprising:
   injecting the steam with a gaseous fluidizing agent comprising hydrogen.

4. The method according to claim 1, wherein a temperature of about 1300° C. is applied during the first thermal treatment.

5. A method of decontamination of radioactive carbonaceous material, comprising:
   providing a first roasting thermal treatment of the material at a temperature between 1200° C. and 1500° C., and
   providing a second thermal treatment of roasting with injection of carbon oxide gas, wherein the carbon oxide gas comprises carbon dioxide and a proportion of carbon monoxide which increases during said second thermal treatment.

6. The method according to claim 5, wherein the second thermal treatment is performed at a temperature between 900° C. and 1100° C.

7. The method according to claim 5, further comprising:
   diluting the carbon oxide gas in an inert gas.

8. The method according to claim 7, wherein the dilution of the carbon oxide gas is increased during the second thermal treatment from a proportion of about 75% inert gas to about 90% inert gas at the end of the second thermal treatment.

9. The method according to claim 5, wherein the temperature applied during the second thermal treatment is between 900° C. and 1100° C. and being increased up to about 1100° C. by the end of the second thermal treatment.

10. The method according to claim 5, wherein the proportion of carbon monoxide increases from 0% to about 50% at the end of the second thermal treatment.

11. The method according to claim 1, comprising:
    providing a third thermal treatment at the end of the roasting of the material by a temperature increase to between 1500° C. and 1600° C.

12. The method according to claim 1, further comprising:
    grinding of the material into particles of a size between 1 and 10 mm prior to the first roasting thermal treatment.

13. The method according to claim 1, wherein the radioactive carbonaceous material comprises graphite.

14. A facility for implementing the method according to claim 1, comprising:
    at least one thermal treatment reactor;
    at least one gas inlet for injection of steam; and
    upstream the reactor, a drier for drying the material so as to control an amount of water present in the reactor during a thermal treatment in the reactor.

15. A facility for implementing the method according to claim 5, comprising:
    at least one thermal treatment reactor for performing a first roasting thermal treatment at a temperature between 1200° C. and 1500° C. and a second roasting thermal treatment; and
    at least one gas inlet for injection of carbon monoxide and carbon dioxide and a mixing controller so as to increase a proportion of carbon monoxide relatively to dioxide carbon during said second thermal treatment.

* * * * *